United States Patent
Wang et al.

(10) Patent No.: US 11,723,018 B2
(45) Date of Patent: Aug. 8, 2023

(54) PHYSICAL UPLINK CONTROL CHANNEL (PUCCH) RESOURCE ALLOCATION

(71) Applicant: QUALCOMM Incorporated, San Diego, CA (US)

(72) Inventors: Renqiu Wang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 16/177,858

(22) Filed: Nov. 1, 2018

(65) Prior Publication Data

US 2019/0174517 A1    Jun. 6, 2019

Related U.S. Application Data

(60) Provisional application No. 62/593,866, filed on Dec. 1, 2017.

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0055* (2013.01); *H04W 72/20* (2023.01); *H04W 72/23* (2023.01)

(58) Field of Classification Search
CPC ..... H04L 5/0055; H04L 5/001; H04L 5/0053; H04L 5/0094; H04W 72/1268;
(Continued)

(56) References Cited

U.S. PATENT DOCUMENTS 9,225,448 B2    12/2015 Seo et al.
9,722,737 B2    8/2017 Fu et al.
(Continued)

FOREIGN PATENT DOCUMENTS

CN    103283170 A    9/2013
CN    103548409 A    1/2014
(Continued)

OTHER PUBLICATIONS

International Search Report and Written Opinion—PCT/US2018/058906—ISA/EPO—dated Jan. 24, 2019.
(Continued)

*Primary Examiner* — Omer S Mian
(74) *Attorney, Agent, or Firm* — Patterson + Sheridan, L.L.P.

(57) ABSTRACT

Certain aspects of the present disclosure relate to methods and apparatus for resource allocation for physical uplink control channel (PUCCH) used to carry uplink control information (UCI). Certain aspects provide a method for wireless communication by a user equipment. The method generally includes receiving downlink control information (DCI) comprising one or more resource indicator (RI) bits configured to indicate to the user equipment a subset of resources available for transmitting UCI in a PUCCH transmission, wherein the DCI is received on one or more resources of a first physical downlink control channel (PDCCH) transmission. The method further includes identifying resources within the subset indicated by the RI bits to transmit the UCI based on an implicit mapping of PDCCH resources to PUCCH resources and the one or more resources of the first PDCCH transmission. The method further includes transmitting the UCI using the identified resources.

44 Claims, 11 Drawing Sheets

(51) Int. Cl.
  *H04W 72/04*        (2009.01)
  *H04W 72/1268*      (2023.01)
  *H04W 72/20*        (2023.01)
  *H04W 72/23*        (2023.01)

(58) Field of Classification Search
  CPC ......... H04W 72/0406; H04W 72/1289; H04W 72/042; H04W 72/0413; H04W 72/1284
  See application file for complete search history.

(56) References Cited

U.S. PATENT DOCUMENTS

| | | | |
|---|---|---|---|
| 2013/0322397 A1 | 12/2013 | Lee et al. | |
| 2014/0219202 A1 | 8/2014 | Kim et al. | |
| 2017/0041123 A1 | 2/2017 | Yang et al. | |
| 2017/0041128 A1 | 2/2017 | Ogawa | |
| 2017/0150494 A1* | 5/2017 | Lee | H04W 72/04 |
| 2017/0302424 A1 | 10/2017 | Seo et al. | |
| 2019/0074935 A1* | 3/2019 | Babaei | H04L 1/1812 |
| 2019/0149271 A1* | 5/2019 | Yin | H04L 1/1816 370/329 |
| 2019/0149305 A1* | 5/2019 | Zhou | H04B 7/0626 370/330 |
| 2020/0044812 A1* | 2/2020 | Yang | H04W 72/12 |
| 2020/0128573 A1* | 4/2020 | Park | H04W 72/1263 |
| 2020/0235866 A1* | 7/2020 | Liu | H04L 5/0055 |

FOREIGN PATENT DOCUMENTS

| | | |
|---|---|---|
| EP | 3319259 A1 | 5/2018 |
| EP | 3349387 A1 | 7/2018 |
| WO | 2016182406 A1 | 11/2016 |
| WO | 2017003265 A1 | 1/2017 |
| WO | 2017043916 A1 | 3/2017 |
| WO | 2017048918 A1 | 3/2017 |
| WO | 2018182408 A1 | 10/2018 |

OTHER PUBLICATIONS

LG Electronics: "ACK/NACK transmission on PUSCH in TDD", R1-110879, 3GPP TSG RAN WG1 #64, Taipei, Taiwan, Feb. 21-25, 2011, 6 Pages.

Taiwan Search Report—TW107139107—TIPO—dated Jun. 27, 2022.

European Search Report—EP21152845—Search Authority—The Hague—dated Mar. 16, 2021.

OPPO: "Summary of RAN1#91 Tdocs on PUCCH Resource Allocation", 3GPP TSG RAN WG1 Meeting 91, R1-1721477, Reno, USA, Nov. 27-Dec. 1, 2017, pp. 1-10.

Qualcomm Incorporated: "Remaining Issues for Resource Allocation for Pucch", 3GPP TSG RAN WG1 Meeting AH 1801, R1-1800874, 3RD Generation Partnership Project, Mobile Competence Centre, 650, Route Des Lucioles, F-06921 Sophia-Antipolis Cedex, vol. Ran WG1, No. Vancouver, Canada, Jan. 22, 2018-Jan. 26, 2018, Jan. 13, 2018, XP051385144, 9 pages Section 2, p. 5, Section 3, p. 6, Section 4, p. 7, Section 5, p. 7-p. 9.

Qualcomm Incorporated: "Resource Allocation for Pucch", 3GPP TSG RAN WG1 Meeting #90b, R1-1718806, 3rd Generation Partnership Project, Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, XP051341951, 10 Pages.

Qualcomm Incorporated: "Resource Allocation for Pucch", 3GPP TSG RAN WG1 Meeting #91, R1-1720686, 3rd Generation Partnership Project, Mobile Competence Centre, 650, Route Des Lucioles, F-06921 Sophia-Antipolis Cedex, France, vol. Ran WG1, No. Reno, US, Nov. 27, 2017-Dec. 1, 2017, Nov. 18, 2017, XP051370147, 22 Pages, Dec. 1, 2017.

Taiwan Search Report—TW107139107—TIPO—dated Apr. 6, 2022.

* cited by examiner

UL centric slot

DL centric slot

PHYSICAL UPLINK CONTROL CHANNEL (PUCCH) RESOURCE ALLOCATION

CROSS-REFERENCE TO RELATED APPLICATIONS

This application claims the benefit of U.S. Provisional Patent No. 62/593,866, filed Dec. 1, 2017. The content of the provisional application is hereby incorporated by reference in its entirety.

BACKGROUND

Field of the Disclosure

The present disclosure relates generally to communication systems and to methods and apparatus for resource allocation for physical uplink control channel (PUCCH) transmissions.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects generally include methods, apparatus, systems, computer readable mediums, and processing systems, as substantially described herein with reference to and as illustrated by the accompanying drawings.

Certain aspects provide a method for wireless communication by a UE. The method generally includes receiving downlink control information (DCI) comprising one or more resource indicator (RI) bits configured to indicate to the user equipment a subset of resources available for transmitting uplink control information (UCI) in a physical uplink control channel (PUCCH) transmission, wherein the DCI is received on one or more resources of a first physical downlink control channel (PDCCH) transmission. The method further includes identifying resources within the subset indicated by the RI bits to transmit the UCI based on an implicit mapping of PDCCH resources to PUCCH resources and the one or more resources of the first PDCCH transmission. The method further includes transmitting the UCI using the identified resources.

Certain aspects provide a method for wireless communication by a UE. The method generally includes receiving, from a base station, an uplink grant comprising one or more downlink assignment index (DAI) bits. The method further includes determining a number of bits to use to transmit an acknowledgement (ACK) based on the DAI bits. The method further includes transmitting, to the base station, the ACK using the determined number of bits.

Certain aspects provide a method for wireless communication by a network entity. The method generally includes transmitting downlink control information (DCI) comprising one or more resource indicator (RI) bits configured to indicate to a user equipment a subset of resources available for transmitting uplink control information (UCI) in a physical uplink control channel (PUCCH) transmission, wherein the DCI is transmitted on one or more resources of a first physical downlink control channel (PDCCH) transmission. The method further includes identifying resources within the subset indicated by the RI bits to monitor for the UCI based on an implicit mapping of PDCCH resources to PUCCH resources and the one or more resources of the first PDCCH transmission. The method further includes monitoring the identified resources for the UCI.

Certain aspects provide a method for wireless communication by a network entity. The method generally includes transmitting, to a user equipment, an uplink grant comprising one or more downlink assignment index (DAI) bits indicating a number of bits for the user equipment to use to transmit an acknowledgement (ACK) based on the DAI bits. The method further includes receiving, from the user equipment, the ACK using the number of bits.

Certain aspects provide a user equipment comprising a memory and a processor coupled to the memory. The processor is configured to receive downlink control information (DCI) comprising one or more resource indicator (RI) bits configured to indicate to the user equipment a subset of resources available for transmitting uplink control information (UCI) in a physical uplink control channel (PUCCH) transmission, wherein the DCI is received on one or more resources of a first physical downlink control channel (PDCCH) transmission. The processor is further configured to identify resources within the subset indicated by the RI bits to transmit the UCI based on an implicit mapping of PDCCH resources to PUCCH resources and the one or more resources of the first PDCCH transmission. The processor is further configured to transmit the UCI using the identified resources.

Certain aspects provide a user equipment comprising a memory and a processor coupled to the memory. The processor is configured to receive, from a base station, an uplink grant comprising one or more downlink assignment index (DAI) bits. The processor is further configured to determine a number of bits to use to transmit an acknowledgement (ACK) based on the DAI bits.

Certain aspects provide a network entity comprising a memory and a processor coupled to the memory. The processor is further configured to transmit downlink control information (DCI) comprising one or more resource indicator (RI) bits configured to indicate to a user equipment a subset of resources available for transmitting uplink control information (UCI) in a physical uplink control channel (PUCCH) transmission, wherein the DCI is transmitted on one or more resources of a first physical downlink control channel (PDCCH) transmission. The processor is further configured to identify resources within the subset indicated by the RI bits to monitor for the UCI based on an implicit mapping of PDCCH resources to PUCCH resources and the one or more resources of the first PDCCH transmission. The processor is further configured to monitor the identified resources for the UCI.

Certain aspects provide a network entity comprising a memory and a processor coupled to the memory. The processor is configured to transmit, to a user equipment, an uplink grant comprising one or more downlink assignment index (DAI) bits indicating a number of bits for the user equipment to use to transmit an acknowledgement (ACK) based on the DAI bits. The processor is further configured to receive, from the user equipment, the ACK using the number of bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
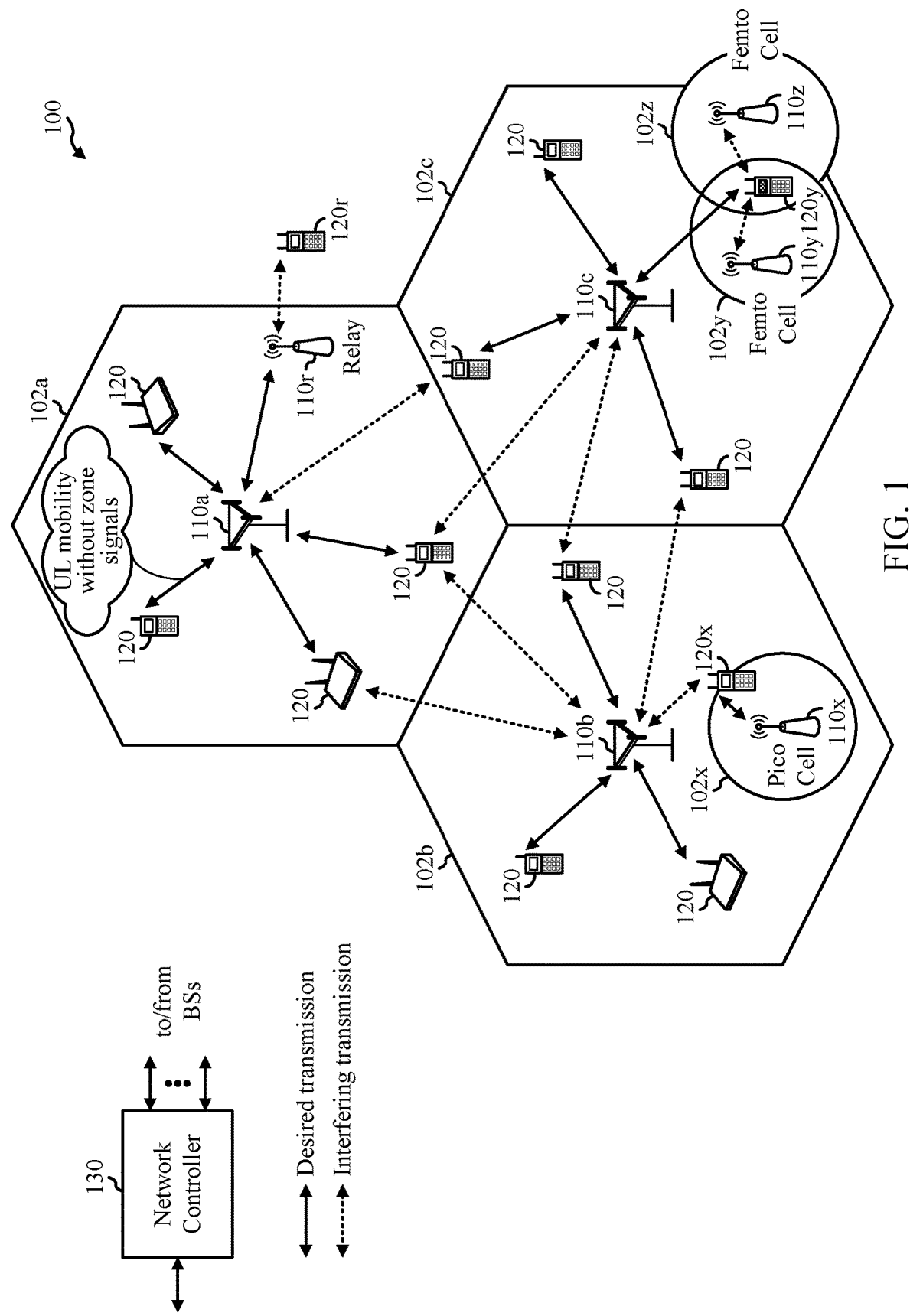
FIG. 1 is a block diagram conceptually illustrating an example telecommunications system, in accordance with certain aspects of the present disclosure.

Aspects of the present disclosure relate to methods and apparatus for determining resources allocated for transmitting uplink control information in a physical uplink control channel (PUCCH).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
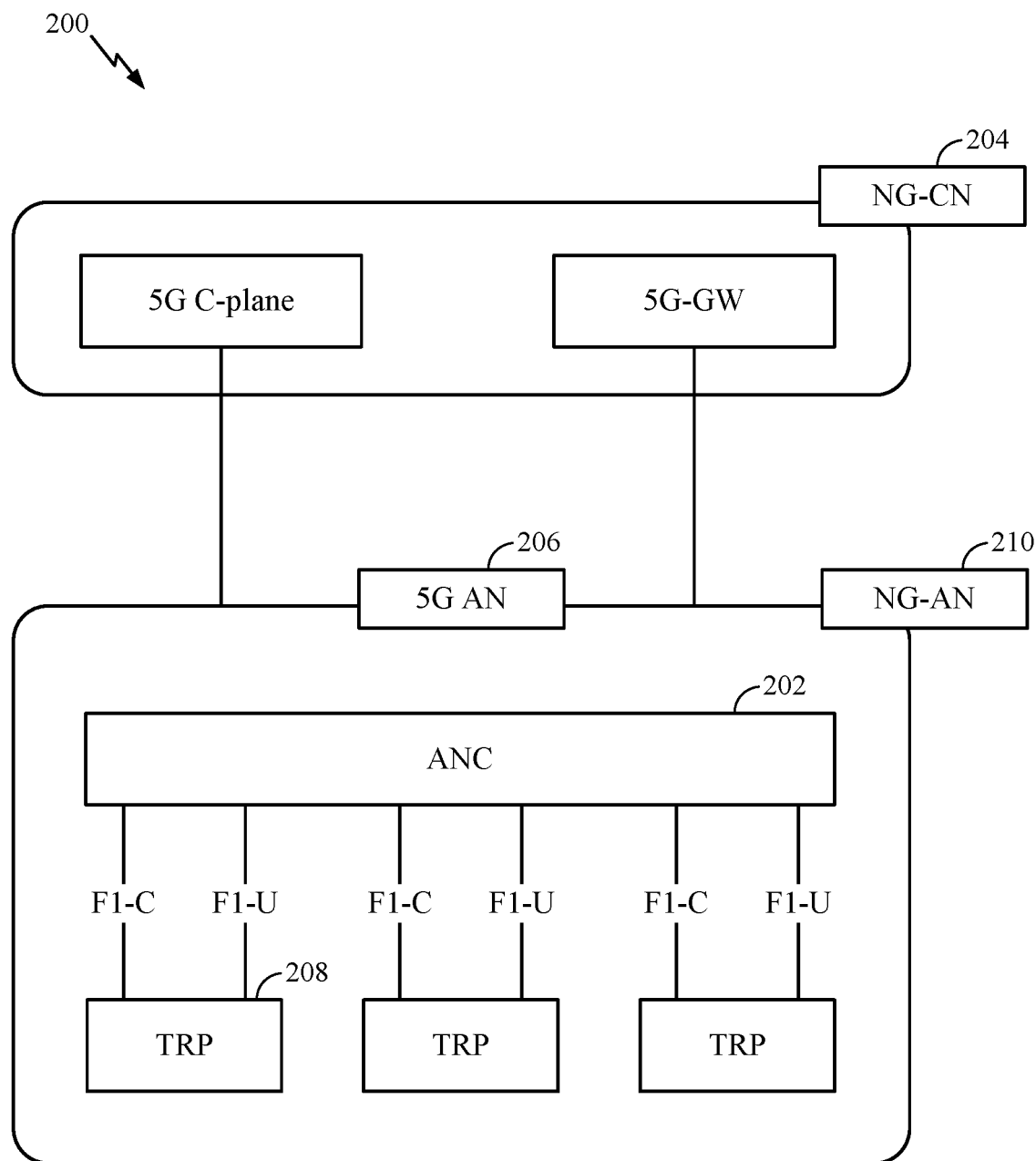
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
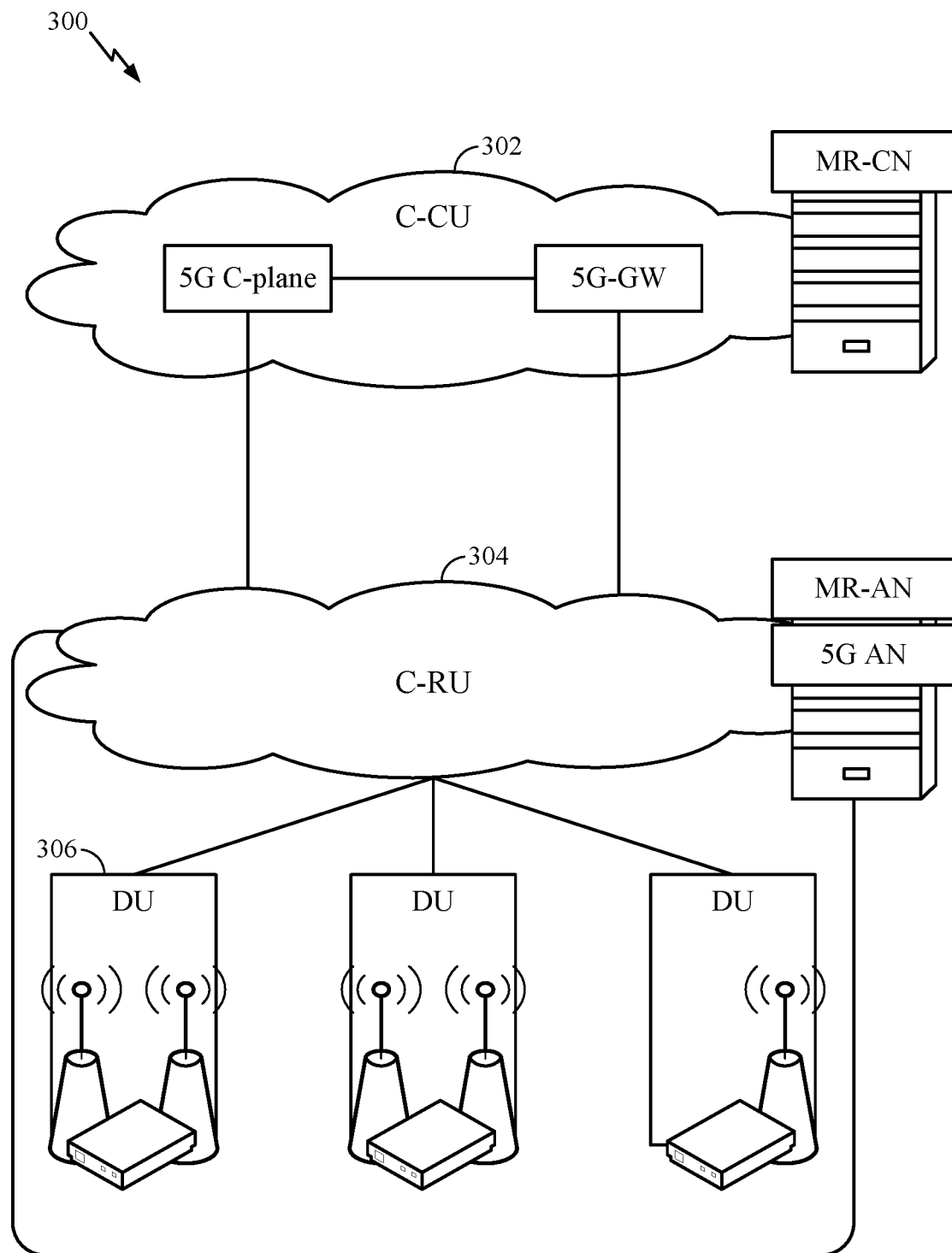
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
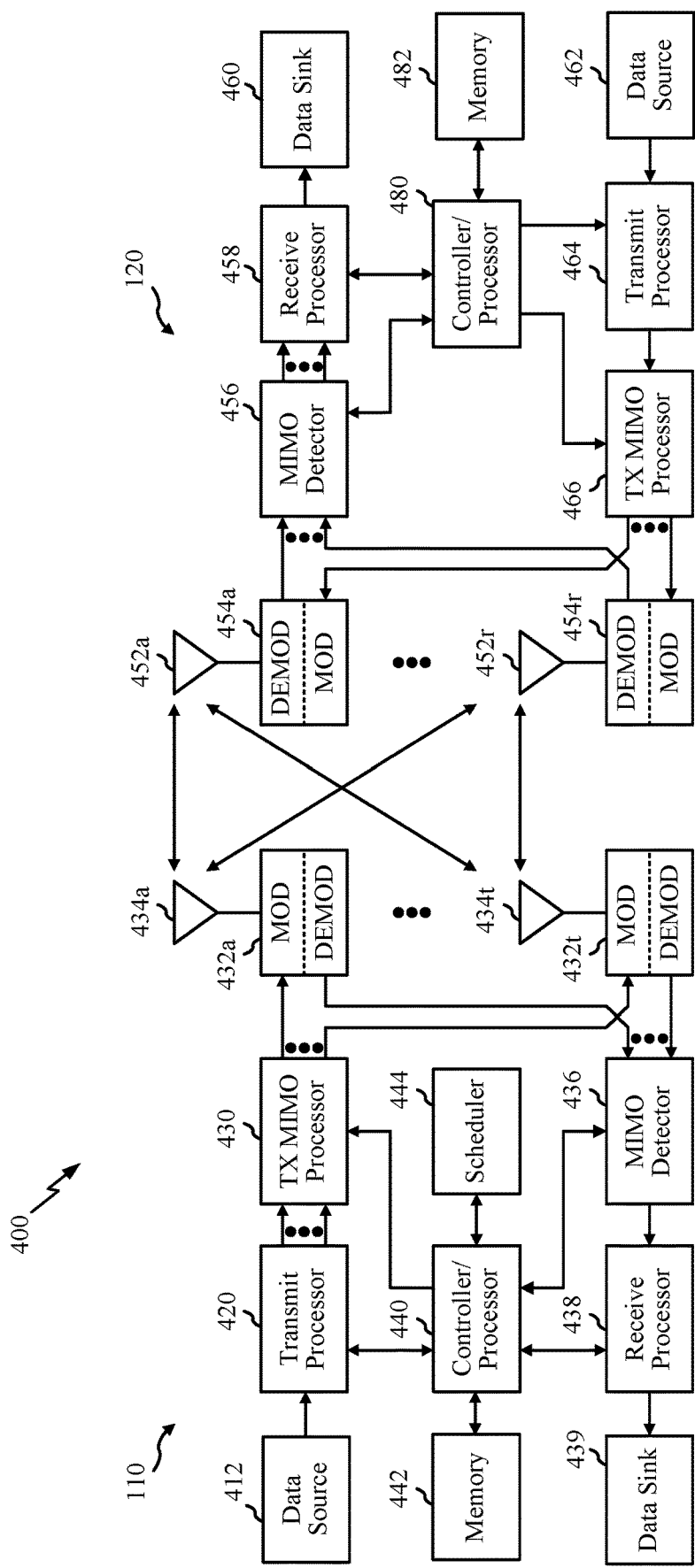
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
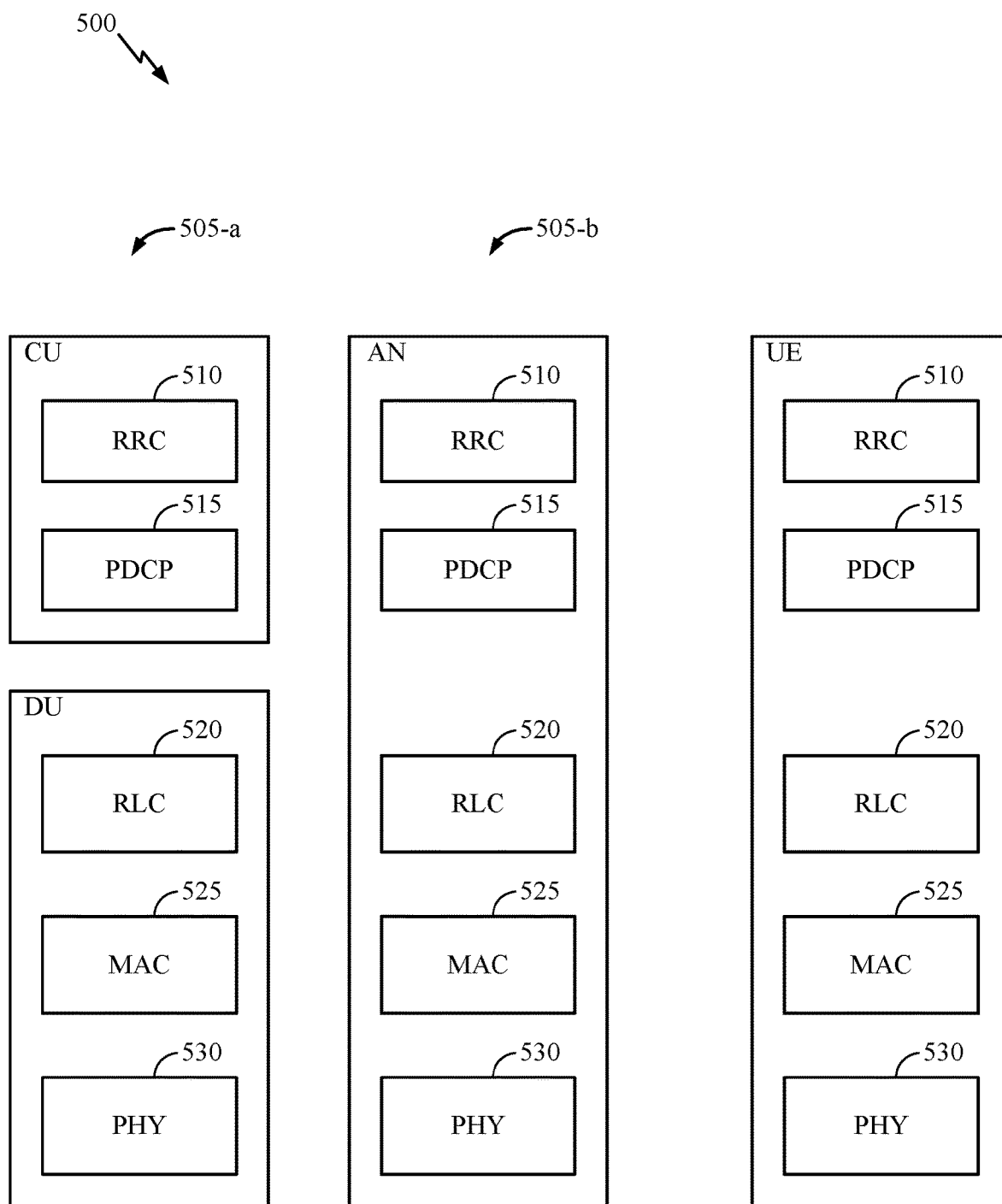
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
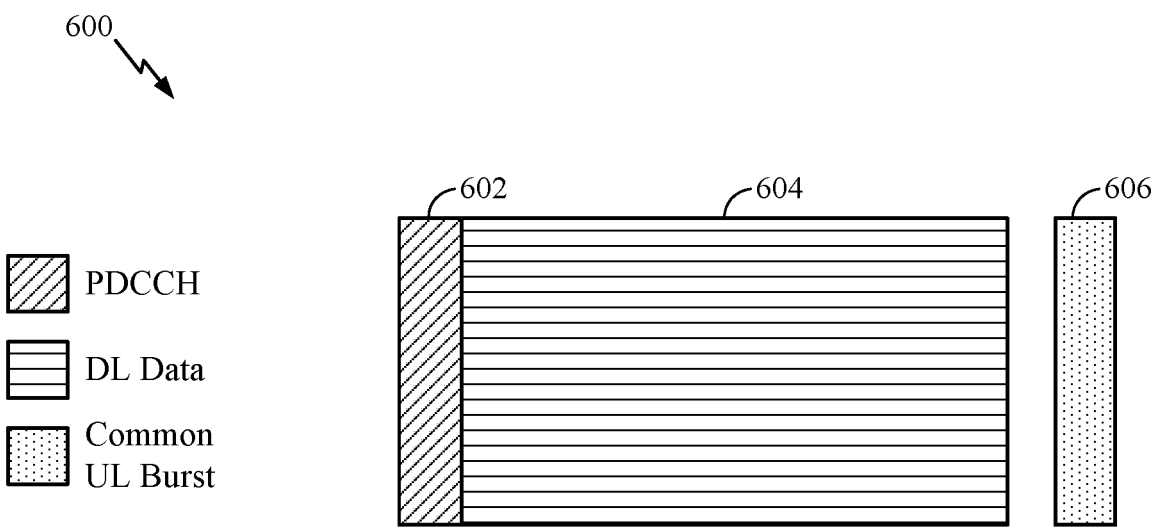
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
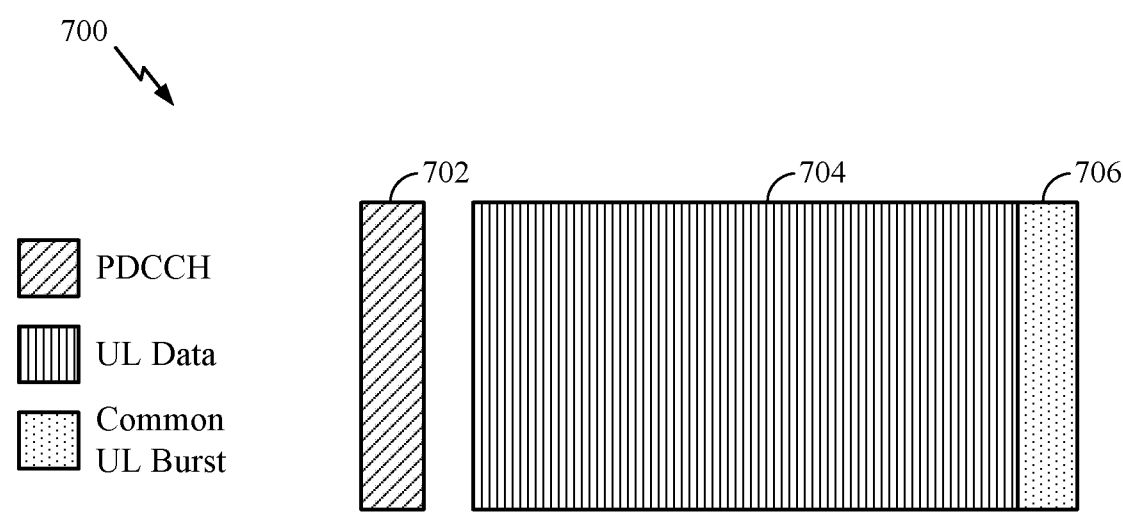
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Slot Design

In mobile communication systems conforming to certain wireless communications standards, such as the Long Term Evolution (LTE) standards, certain techniques may be used to increase the reliability of data transmission. For example, after a base station performs an initial transmission operation for a specific data channel, a receiver receiving the transmission attempts to demodulate the data channel during which the receiver performs a cyclic redundancy check (CRC) for the data channel. If, as a result of the check, the initial transmission is successfully demodulated, the receiver may send an acknowledgement (ACK) to the base station to acknowledge the successful demodulation. If, however, the initial transmission is not successfully demodulated, the receiver may send a non-acknowledgement (NACK) to the base station. A channel that transmits ACK/NACK is called a response or an ACK channel.

In some cases, under the LTE standards, an ACK channel may comprise two slots (i.e. one subframe) or 14 symbols, which may be used to transmit an ACK that may comprise one or two bits of information. In some cases, when transmitting ACK channel information, a wireless device may perform frequency hopping. Frequency hopping refers to the practice of repeatedly switching frequencies within a frequency band in order to reduce interference and avoid interception.

Figure 8A:
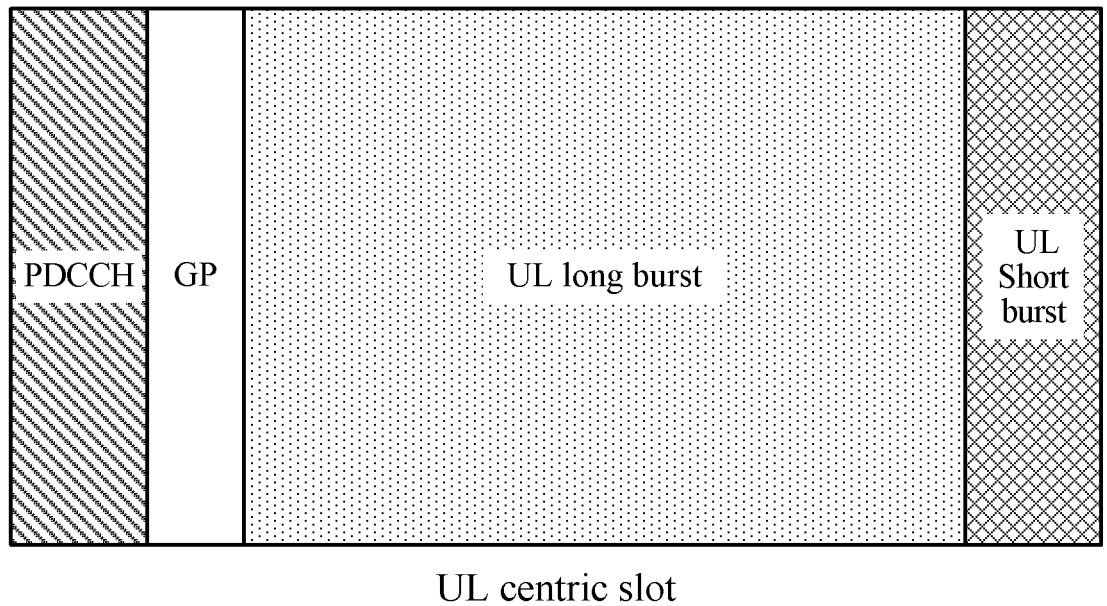
FIGS. 8a and 8b illustrate example uplink and downlink structures, respectively, in accordance with certain aspects of the present disclosure.

Under other wireless communications standards, such as NR, the ACK channel information as well as other information may be transmitted through an uplink structure shown in FIG. 8a. FIG. 8a illustrates an example uplink structure with a transmission time interval (TTI) that includes a region for long uplink burst transmissions. The long uplink burst may transmit information such as acknowledgment (ACK), channel quality indicator (CQI), or scheduling request (SR) information.

Figure 8B:
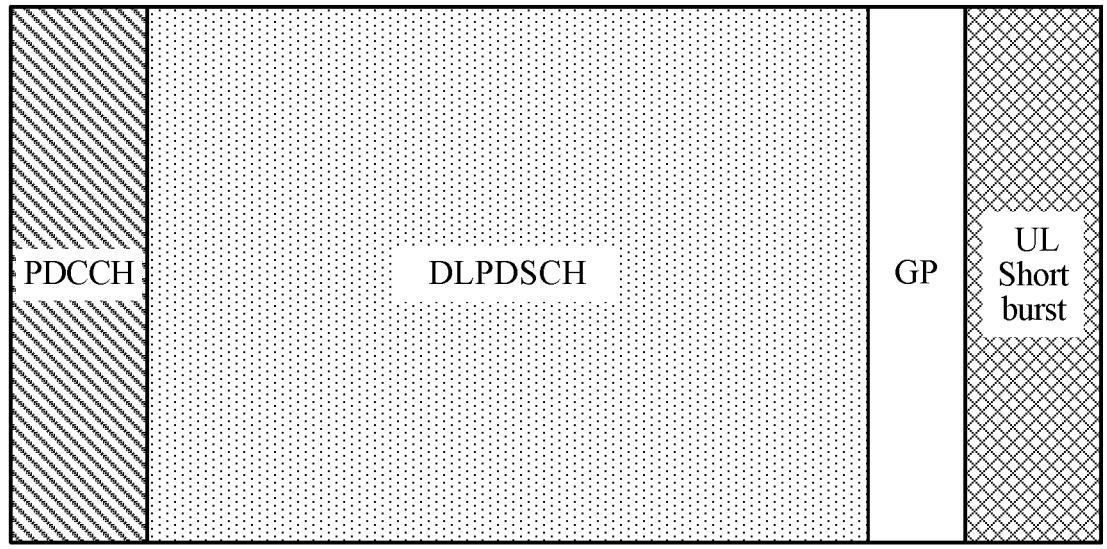

The duration of the region for long uplink burst transmissions, referred to in FIG. 8 as "UL Long Burst," may vary depending on how many symbols are used for the physical downlink control channel (PDCCH), the gap, and the short uplink burst (shown as UL Short Burst), as shown in FIG. 8. For example, the UL Long Burst may comprise a number of slots (e.g., 4), where the duration of each slot may vary from 4 to 14 symbols. FIG. 8b also shows a downlink structure having a TTI that includes PDCCH, downlink physical downlink shared channel (PDSCH), a gap, and an uplink short burst. Similar to the UL Long Burst, the duration of the DL PDSCH may also depend on the number of symbols used by the PDCCH, the gap, and the uplink short burst.

As noted above, UL short burst may be 1 or 2 symbols and different approaches may be used to transmit UCI in this duration. For example, according to a "1 symbol" UCI design, 3 or more bits of UCI may be sent using frequency division multiplexing (FDM). For 1 or 2 bits of acknowledgment (ACK) or a 1 bit scheduling request (SR), a sequence based design may be used. For example, an SR may be sent with 1 sequence, on-off keying, and may multiplex up to 12 users per RB. For a 1-bit ACK, 2 sequences may be used, and up to 6 users may be multiplexed per RB. For a 2-bit ACK, 4 sequences may be used and up to 3 users may be multiplexed per RB.

Example RE Mapping Rule For UCI Piggyback on PUSCH

There are a number of approaches to multiplex simultaneous PUCCH and PUSCH from a same UE that may be provided. For example, a first approach may include transmitting PUCCH and PUSCH on different RBs, such as, FDM PUCCH and PUSCH. A second approach may include piggybacking PUCCH on assigned PUSCH RBs. Both approaches may be supported in NR.

UCI piggybacking on PUSCH may include, for frequency first mapping, UCI resource mapping principles (e.g., around RS) that may be common for PUSCH with DFT-s-OFDM waveform and CP-OFDM waveform. UCI piggybacking on PUSCH may also include UL data that may be rate-matched around the UCI at least for a periodic CSI report configured by RRC and/or an aperiodic CSI report triggered by UL grant.

In one or more cases, slot-based scheduling for HARQ-ACK with more than two bits may include PUSCH that is rate-matched. In some cases, PUSCH may be punctured for slot-based scheduling for HARQ-ACK with up to two bits. In one or more cases, NR may provide a sufficiently reliable common understanding on HARQ-ACK bits between gNB and UE. In some cases, additional considerations may be taken into account regarding channel multiplexing of PUCCH and PUSCH.

Considerations associated with UCI piggybacking on PUSCH may include how to decide the HARQ-ACK piggyback rule. For example, if PUSCH is punctured by ACK, in the case of a large ACK payload size, the impact to PUSCH decoding performance may be non-negligible. If PUSCH is rate-matched around ACK, in cases where a UE miss-detects DCI, an eNB and UE may have different assumption on the number of ACK bits piggybacked on PUSCH, which may require the eNB to performance blind detection to solve such an ambiguity. Further, as the ACK payload size increases, a number of blind detections that the eNB may need to perform may also increase.

Example PUCCH Resource Allocation For NR

Aspects of the present disclosure relate to methods and apparatus for determining resources allocated for transmitting uplink control information in a physical uplink control channel (PUCCH).

In some cases, to signal resources available for sending uplink control information (UCI) such as ACK/NACK or SR, an eNB may use allocation resource indicator (ARI) bits. The ARI bits may explicitly indicate PUCCH resources available for transmitting UCI. For example, a 2-bit ARI may indicate one of four resources available for transmitting UCI.

In some cases, there may be more sets of resources available than can be explicitly signaled. For example, if there are more than four sets of resources, a 2-bit ARI may be insufficient and an implicit mapping for PUCCH resource allocation may be used. The number of PUCCH resources in a resource set is configured.

As will be described herein, aspects of the present disclosure provide techniques for implicitly signaling a sub-set within a resource set, where no additional RRC impact is necessary. For example, additional RRC signaling may not be needed for the implicit signaling, thereby reducing network bandwidth for indicating resources available for transmitting UCI.

Figure 9:
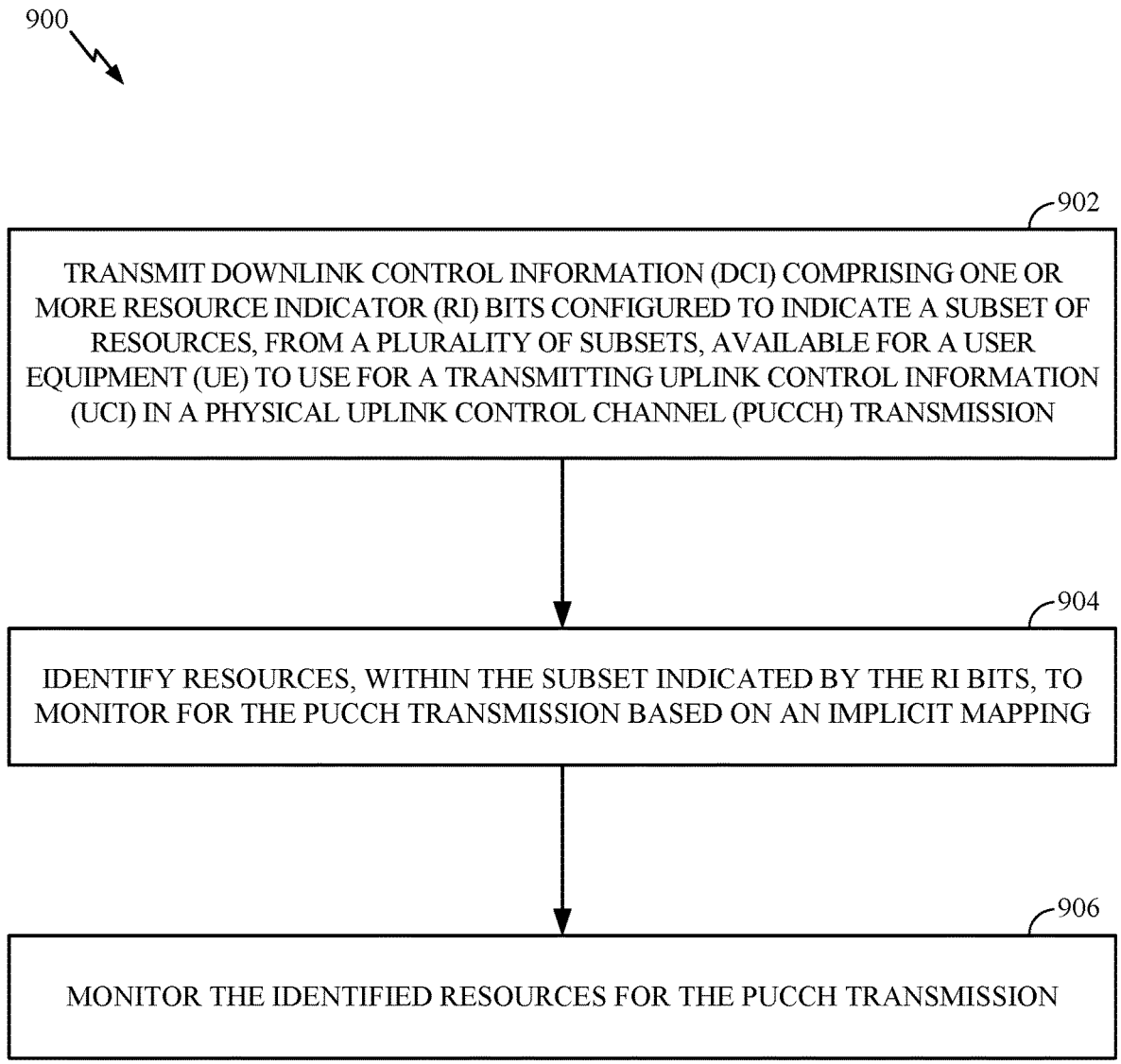
FIG. 9 illustrates example operations for wireless communications by a network entity, in accordance with certain aspects of the present disclosure.

FIG. 9 illustrates example operations 900 that may be performed by a network entity, such as an eNB, for allocating PUCCH resources in accordance with aspects of the present disclosure.

Operations 900 begin, at 902, by transmitting downlink control information (DCI) comprising one or more resource indicator (RI) bits configured to indicate a subset of resources, from a plurality of subsets, available for a user equipment (UE) to use for a transmitting uplink control information (UCI) in a physical uplink control channel (PUCCH) transmission. At 904, the network entity identifies resources, within the subset indicated by the RI bits, to monitor for the PUCCH transmission based on an implicit mapping. At 906, the network entity monitors the identified resources for the PUCCH transmission.

Figure 10:
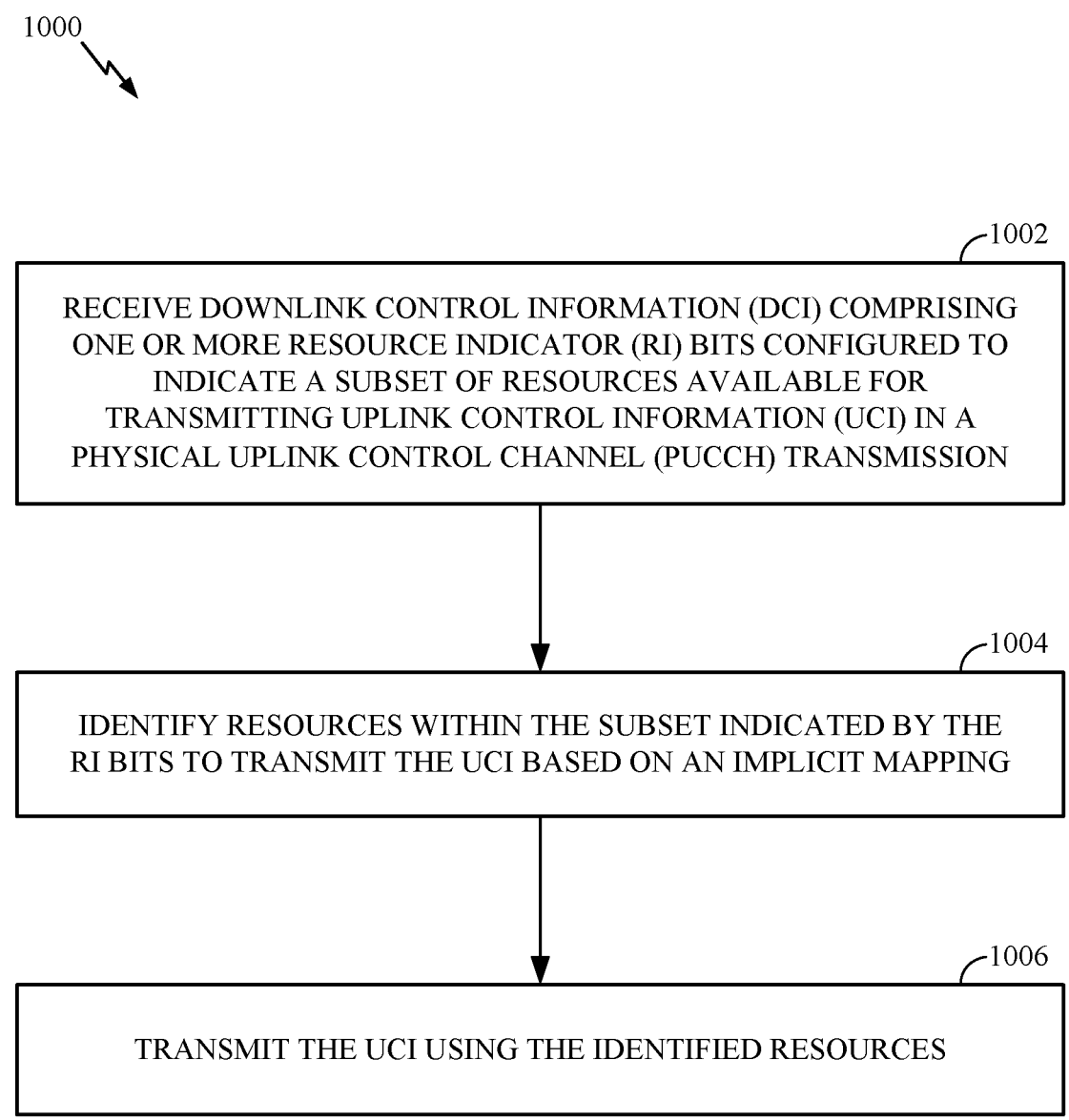
FIG. 10 illustrates example operations for wireless communications by a user equipment, in accordance with certain aspects of the present disclosure.

FIG. 10 illustrates example operations 1000 that may be performed by a user equipment (UE), in accordance with aspects of the present disclosure. For example, operations 1000 may be performed by a UE to determine resources for sending to an eNB performing operations 900.

Operations 1000 begin, at 1002, by receiving downlink control information (DCI) comprising one or more resource indicator (RI) bits configured to indicate a subset of resources available for transmitting uplink control information (UCI) in a physical uplink control channel (PUCCH) transmission. At 1004, the UE identifies resources within the subset indicated by the RI bits to transmit the UCI based on an implicit mapping. At 1006, the UE transmits the UCI using the identified resources.

Figure 11:
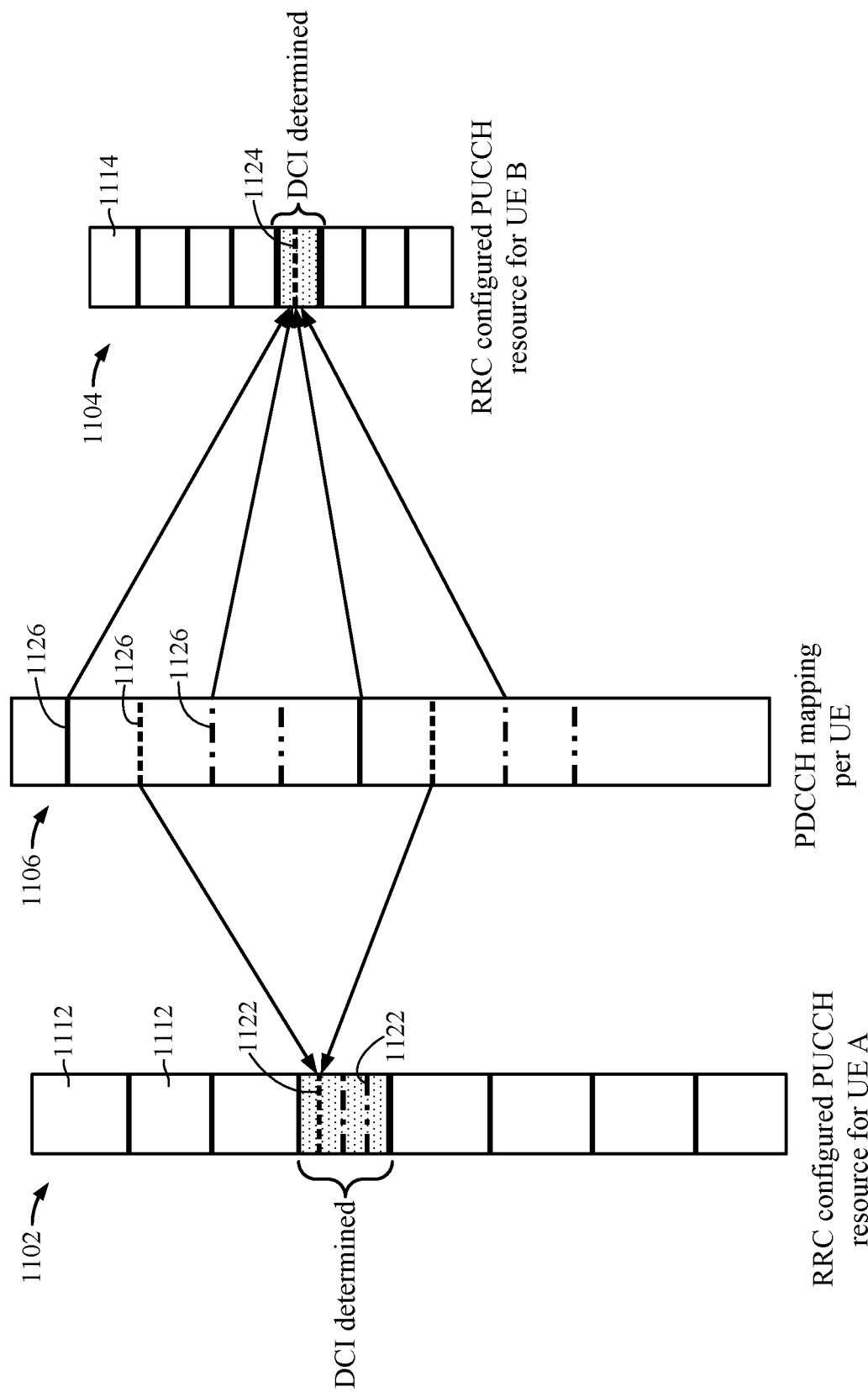
FIG. 11 illustrates an example of resource allocation for a physical uplink control channel (PUCCH) transmission, in accordance with certain aspects of the present disclosure.

FIG. 11 illustrates an example of resource allocation for a physical uplink control channel (PUCCH) transmission, in accordance with certain aspects of the present disclosure. For example, FIG. 11 shows how different sets of resources (e.g., time resources, frequency resources, etc.) may be available for PUCCH transmission. Different UEs may be configured with different sets, via RRC signaling. In some cases, explicit signaling (e.g., ARI bits) may be used to signal one of the sets of resources, while implicit mapping may be used to identify resources within the sets.

For example, FIG. 11 illustrates a set of PUCCH resources 1102 configured for a first UE 120a and a set of PUCCH resources 1104 configured for a second UE 120b. As shown, the set of PUCCH resources 1102 are divided into subsets of resources 1112. In particular, in certain aspects as shown, the set of PUCCH resources 1102 are divided into 8 subsets of resources 1112. The subsets of resources 1112 are further divided into the PUCCH resources 1122. Similarly, the set of PUCCH resources 1104 are divided into subsets of resources 1114. In particular, in certain aspects as shown, the set of PUCCH resources 1104 are divided into 8 subsets of resources 1114. The subsets of resources 1114 are further divided into the PUCCH resources 1124. In certain aspects, the sets of PUCCH resources 1102 and 1104 may be divided into a different number of subsets of resources 1112 and 1114.

As shown in FIG. 11, each subset of resources 1112 includes 4 resources per subset, while each subset of resources 1114 includes 2 resources per subset. In certain aspects, the subsets of resources 1112 and subsets of resources 1114 include different numbers of PUCCH resources than shown. The size of a subset of resources 1112/1114 may correspond to the number of PUCCH resources in the subset. In certain aspects, each subset of resources for a given UE (e.g., subsets 1112 or subsets 1114) has the same size. In certain aspects, at least two different subsets of a given UE have a different size. In certain aspects, at least two different UEs have subsets of different sizes. In certain aspects, UEs have subsets of the same size.

FIG. 11 further illustrates a set of PDCCH resources 1106 including a plurality of PDCCH resources 1126. As shown, the PDCCH resources 1126 may map to PUCCH resources 1122/1124. In particular, in certain embodiments, the PDCCH resources 1126 used for transmission by BS 110 to UEs 120 on the DL are mapped to PUCCH resources used for transmission by UEs 120 to BS 110 on the UL. In certain aspects, the BS 110 may determine what to include in the PDCCH resources 1126 to indicate information to the UEs 120 as to what PUCCH resources to use and transmit such information in the PDCCH resources 1126. Further, in certain aspects, a given UE 120 may determine which PUCCH resources to use for transmission based on which PDCCH resources 1126 the UE 120 receives transmissions, and information in the transmissions.

In certain aspects, the BS 110 explicitly signaling in the PDCCH to the UE 120 exactly which resources (e.g., time resources, frequency resources, etc.) of the PUCCH to use for transmitting UCI (e.g., a transmission such as transport block (TB), etc.) may require a large number of bits, which may be inefficient. For example, the set of PUCCH resources 1102 may include 32 PUCCH resources 1122, requiring 5-bits to signal. Accordingly, explicitly signaling in the PDCCH the resources on the PUCCH to use for transmitting UCI may utilize network bandwidth for the signaling, and therefore increase network overhead in the network, thereby reducing overall data throughput. Accordingly, certain aspects herein relate to at least partially implicitly mapping the resources in the PDCCH to UL resources on the PUCCH to utilize for communicating the UCI on the PUCCH. Both a UE and BS may perform the implicit mapping, the UE to determine which PUCCH resources to use to transmit the UCI and actually transmit the UCI, and the BS to receive the UCI and determine which data transmission the UCI is for based on the PUCCH resources on which it is received.

In certain aspects, BS 110 may transmit DCI with one or more RI bits to indicate a subset of resources available for transmitting UCI in a PUCCH transmission. The RI bits may accordingly be used to explicitly map to a particular subset of resources 1112/1114 of a set of PUCCH resources 1102/1104 associated with the UE 120 the DCI is sent to (i.e., intended for).

The PDCCH may span a number of subcarriers in the frequency domain and a number of OFDM symbols in the time domain. The minimum resource element of a PDCCH may be referred to as a resource element (RE) and correspond to one OFDM symbol and one subcarrier. REs may be grouped into resource element groups (REGs). Each REG may include a number of (e.g., 4 consecutive) REs within the same OFDM symbol and the same resource block (RB). REGs may be grouped into control channel elements (CCEs). Each CCE may include a number of (e.g., 9 contiguous) REGs. The CCEs in the PDCCH may be indexed and each CCE referenced by index number corresponding to the position of the CCE in the PDCCH. Accordingly, the DCI transmission by the BS 110 may be carried in a particular CCE of a PDCCH, the CCE having a particular index.

In certain aspects, the CCE index of the CCE carrying the DCI may be used to implicitly map to a particular PUCCH resource 1122/1124 in the subset of resources 1112/1114 indicated by the DCI.

In certain aspects, if there are X number of RI bits signaled to the UE 120 by the BS 110 (e.g., in DCI of a PDCCH), and there are Y number of PUCCH resources (e.g., 1122 or 1124) the UE 120 is configured (e.g., using RRC) to use for one set of PUCCH resources (e.g., 1102 or 1104), then there may be $2^X$ subsets of resources (e.g., 1112 or 1114) indicated by the RI bits. If $Y/(2^X)$ is not an integer, then different subsets may have a different size.

In certain aspects, if $Z=Y \% 2^X$ and $M=\text{floor}(Y/2^X)$, then there may be $2^X-Z$ subsets with M PUCCH resources, and Z subsets with M+1 PUCCH resources.

In certain aspects, the Y resources may be divided into $2^X$ subsets of resources as follows: 1) for the first Z subsets each has M+1 resources; and 2) the remaining subsets each have M resources. In certain other aspects, the Y resources may be divided into $2^X$ subsets of resources as follows: 1) the first $2^X-Z$ subsets each have M PUCCH resources; and 2) the remaining subsets each have M+1 PUCCH resources.

In certain aspects, a base station (e.g., BS 110) and UE 120 may support carrier aggregation (CA), meaning the BS 110 and UE 120 can communicate over multiple frequencies (e.g., multiple ranges of frequencies of one or more bandwidths) referred to as carriers, or component carriers (CCs). These carriers may or may not be contiguous in frequency. When CA is used by the BS 110, the BS 110 may support a plurality of serving cells, one for each carrier. The coverage area of each serving cell may differ. In certain aspects, radio resource control (RRC) connection procedures (e.g., during handover, after a radio link failure (RLF), for initial connection, etc.) for the UE 120 connecting to the BS 110 are handled by the BS 110 using only one of the carriers (referred to as a primary carrier), which serves one of the cells referred to as the primary cell (PCell). The remaining cells may be referred to as secondary cells (SCells) and are served by the remaining carriers (referred to as secondary carriers).

In certain aspects, PDCCH is carried on multiple CCs (e.g., each CC). Accordingly, if there are multiple CCs used for communication between the BS 110 and a UE 120, there may be multiple PDCCHs transmitted on multiple CCs (e.g., a PDCCH on each CC) from BS 110 to UE 120. In certain aspects, only one of the multiple PDCCHs may be used to map to PUCCH resources. In certain aspects, the other PDCCHs are ignored (e.g., any RI bits and CCE index of the CCE carrying the RI bits in the other PDCCHs are ignored and not used to map to PUCCH resources). In certain aspects, the PDCCH carried on the CC with the smallest/lowest index is used to map to PUCCH resources using the techniques described herein. In certain aspects, the PDCCH carried on the CC with the largest/highest index is used to map to PUCCH resources using the techniques described herein. In certain aspects, the UCI for the multiple PDCCH are transmitted in the same UL slot.

Similarly, to how multiple PDCCHs may be transmitted from BS 110 to UE 120 using multiple CCs, multiple PDCCHs may be transmitted from BS 110 to UE 120 on multiple slots (e.g., time slots when using cross slot scheduling). Accordingly, there may be multiple ACK bits transmitted on the same UL slot. In certain aspects, only one of the multiple PDCCHs may be used to map to PUCCH resources. In certain aspects, the other PDCCHs are ignored (e.g., any RI bits and CCE index of the CCE carrying the RI bits in the other PDCCHs are ignored and not used to map to PUCCH resources). In certain aspects, the PDCCH received at the UE 120 (e.g., transmitted by the BS 110) in the most recent/last slot in time is used to map to PUCCH resources using the techniques described herein. In certain aspects, the UCI for the multiple PDCCH are transmitted in the same UL slot.

In certain aspects, UE 120 may be configured to transmit a scheduling request (SR) to BS 110 to send an UL grant to the UE 120 for the UE 120 to transmit (e.g., on PUSCH). In certain aspects, the SR may have a periodicity that is small (e.g., less than slot duration, such as 1, 2, or 3 symbols). Accordingly, a positive SR may show up (e.g., need to be transmitted by the UE 120) in the middle of or during a long PUCCH or PUSCH transmission from the UE 120. In certain such aspects, such a SR is for an ultra-reliable low latency communications (URLLC) UE 120. In certain such aspects, such a SR is for an enhanced mobile broadband (eMBB) UE 120. In certain such aspects, such a SR is for a UE that supports eMBB and URLLC.

In certain aspects, if there is a long PUCCH (e.g., for URLLC or eMMB)/PUSCH transmitted by the UE 120 and a SR shows up, the UE 120 may drop the long PUCCH/

PUSCH from that SR symbol. For example, the UE 120 may transmit PUCCH/PUSCH in symbols up until the SR symbol, and then not transmit PUCCH/PUSCH on the remaining symbols.

In certain aspects, if a SR symbol (e.g., for URLLC) shows up during PUSCH or PUCCH transmission (e.g., for eMMB) at a given UE 120, the UE 120 may drop the long PUCCH/PUSCH from that SR symbol to yield to URLLC.

In certain aspects, when UE 120 transmits ACK (e.g., or UCI) on PUSCH, for 1 or 2 bits of ACK, the ACK bits puncture PUSCH. For ACK>2 bits, ACK bits are rate matched around by the PUSCH.

In order to avoid confusion on the number of ACK bits between the UE 120 and BS 110, e.g., to successfully decode the ACK bits and data on PUSCH, the BS 110 may include in the UL grant to the UE 120 downlink assignment index (DAI) bits (e.g., 2 or 3) to indicate the number of ACK bits the UE 120 should transmit on PUSCH.

In certain aspects, the UE 120 and BS 110 are configured with a semi-static HARQ-ACK codebook size (e.g., when transmitting ACK always transmit X (e.g., 4) number of bits). For example, the HARQ-ACK payload size is given in RRC signaling from BS 110 to UE 120. Therefore, the only uncertainty is if there are any ACK bits at all. For example, the UE 120 may not successfully receive PDCCH/PDSCH, then it may not know it needs to transmit ACK bits. Accordingly, in certain aspects, when using a semi-static HARQ-ACK codebook size, 1 DAI bit may be added to the UL grant to indicate if ACK bits are expected or not.

In certain aspects, no DAI bits are added to the UL grant, and accordingly, the BS 110 may need to do blind detection on the two hypothesis (either PUSCH only (0, 1, 2 ACK bits) or PUSCH rate matched around X ACK bits). The correct hypothesis is then used by the BS 110 to get the data and ACK bits (if present).

Figure 12:
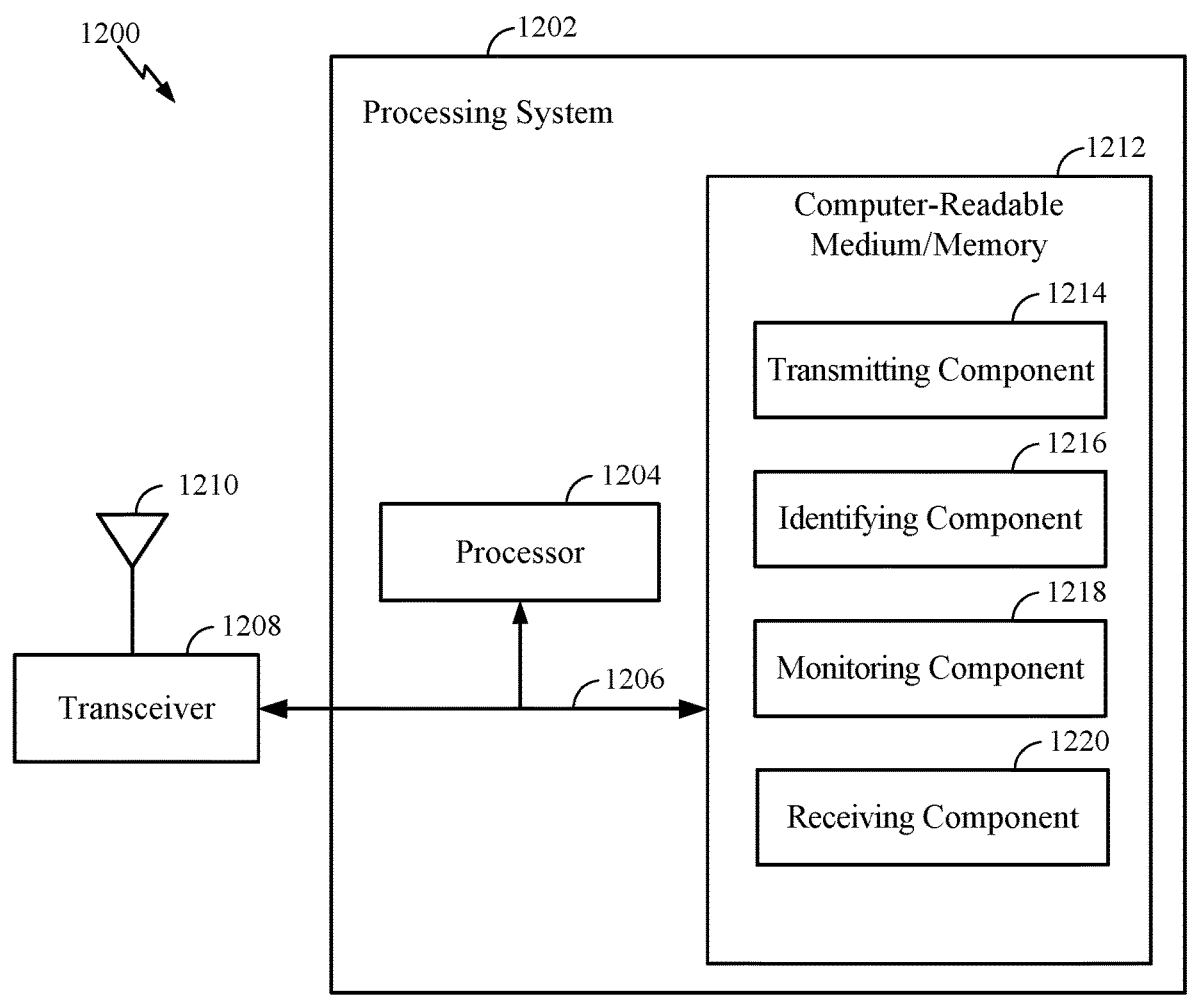
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9 or 10. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIG. 9 or 10, or other operations for performing the various techniques discussed herein.

In certain aspects, the processing system 1202 further includes a transmitting component 1214 for performing the operations illustrated in 902 of FIG. 9 or 1006 of FIG. 10. Additionally, the processing system 1202 includes an identifying component 1216 for performing the operations illustrated in 904 of FIG. 9 or 1004 of FIG. 10. Additionally, the processing system 1202 includes a monitoring component 1218 for performing the operations illustrated in 906 of FIG. 9. Additionally, the processing system 1202 includes a receiving component 1220 for performing the operations illustrated in 1002 of FIG. 10. The transmitting component 1214, identifying component 1216, monitoring component 1218, and receiving component 1220 may be coupled to the processor 1204 via bus 1206. In certain aspects, the transmitting component 1214, identifying component 1216, monitoring component 1218, and receiving component 1220 may be hardware circuits. In certain aspects, the transmitting component 1214, identifying component 1216, monitoring component 1218, and receiving component 1220 may be software components that are executed and run on processor 1204.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment, comprising:
   receiving downlink control information (DCI) comprising one or more resource indicator (RI) bits configured to indicate to the user equipment a subset of resources available for transmitting uplink control information (UCI) in a physical uplink control channel (PUCCH) transmission, wherein:
      the DCI is received on one or more resources of a first physical downlink control channel (PDCCH) transmission, wherein the subset is one of a plurality of subsets, each of the plurality of subsets corresponding to a unique subset of PUCCH resources; and
      a number of RI bits is X, wherein a total number of PUCCH resources is Y, wherein a total number of subsets of the PUCCH resources is 2^X, wherein (Y modulo 2^X) of the total number of subsets consist of (floor(Y/2^X)+1) PUCCH resources and any remaining of the total number of subsets consist of (floor(Y/2^X)) PUCCH resources;
   determining, based on the RI bits of the DCI, the subset of resources available for transmitting UCI in the PUCCH;
   identifying a particular PUCCH resource within the determined subset of resources to transmit the UCI based on an implicit mapping of PDCCH resources to PUCCH resources and the one or more resources of the first PDCCH transmission; and
   transmitting the UCI using the particular PUCCH resource.

2. The method of claim 1, further comprising:
   receiving multiple PDCCH transmissions on multiple component carriers (CCs) or across multiple slots, wherein the UCI acknowledges the multiple PDCCH transmissions.

3. The method of claim 1, further comprising receiving multiple PDCCH transmissions, wherein the first PDCCH transmission is a last transmission of the multiple PDCCH transmissions.

4. The method of claim 1, further comprising receiving multiple PDCCH transmissions, wherein the first PDCCH transmission has a smallest component carrier (CC) index of the multiple PDCCH transmissions.

5. The method of claim 1, further comprising receiving multiple PDCCH transmissions, wherein the UCI acknowledges the multiple PDCCH transmissions, and wherein the UCI is sent in a same uplink (UL) slot.

6. The method of claim 1, wherein at least two of the plurality of subsets have different sizes.

7. The method of claim 1, wherein each of the plurality of subsets has the same size.

8. The method of claim 1, wherein the implicit mapping is based on a control channel element (CCE) index of the first PDCCH transmission.

9. A method for wireless communications by a user equipment, comprising:
   receiving, from a base station, an uplink grant comprising an indication of an uplink resource to transmit an acknowledgement (ACK) and one or more downlink assignment index (DAI) bits;
   determining a number of bits to use to transmit the ACK based on the DAI bits; and
   transmitting, to the base station, the ACK via the uplink resource using the determined number of bits,
   wherein when the user equipment and base station are configured with a semi-static HARQ-ACK codebook size, a number of DAI bits is one and the one DAI bit is added to the uplink grant to indicate to the user equipment whether or not to transmit the ACK and the number of bits are determined according to the semi-static HARQ-ACK codebook size.

10. The method of claim 9, wherein transmitting the ACK via the uplink resource comprises transmitting the ACK on a physical uplink shared channel (PUSCH).

11. The method of claim 10, wherein when the determined number of bits is 1 or 2 the ACK punctures the PUSCH, and wherein when the determined number of bits is greater than 2 the ACK is rate matched around the PUSCH.

12. A method for wireless communications by a network entity, comprising:
   transmitting downlink control information (DCI) comprising one or more resource indicator (RI) bits configured to indicate to a user equipment a subset of resources available for transmitting uplink control information (UCI) in a physical uplink control channel (PUCCH) transmission, wherein:
      the DCI is received on one or more resources of a first physical downlink control channel (PDCCH) transmission, wherein the subset is one of a plurality of subsets, each of the plurality of subsets corresponding to a unique subset of PUCCH resources; and
      a number of RI bits is X, wherein a total number of PUCCH resources is Y, wherein a total number of subsets of the PUCCH resources is 2^X, wherein (Y modulo 2^X) of the total number of subsets consist of (floor(Y/2^X)+1) PUCCH resources and any remaining of the total number of subsets consist of (floor(Y/2^X)) PUCCH resources;
   determining, based on the RI bits of the DCI, the subset of resources available for transmitting UCI in the PUCCH;
   identifying a particular PUCCH resource within the determined subset of resources to monitor for the UCI based on an implicit mapping of PDCCH resources to PUCCH resources and the one or more resources of the first PDCCH transmission; and
   monitoring the particular PUCCH resource for the UCI.

13. The method of claim 12, further comprising:
transmitting multiple PDCCH transmissions on multiple component carriers (CCs) or across multiple slots, wherein the UCI acknowledges the multiple PDCCH transmissions.

14. The method of claim 12, further comprising transmitting multiple PDCCH transmissions, wherein the first PDCCH transmission is a last transmission of the multiple PDCCH transmissions.

15. The method of claim 12, further comprising transmitting multiple PDCCH transmissions, wherein the first PDCCH transmission has a smallest component carrier (CC) index of the multiple PDCCH transmissions.

16. The method of claim 12, further comprising transmitting multiple PDCCH transmissions, wherein the UCI acknowledges the multiple PDCCH transmissions, and wherein the UCI is communicated in a same uplink (UL) slot.

17. The method of claim 12, wherein at least two of the plurality of subsets have different sizes.

18. The method of claim 12, wherein each of the plurality of subsets has the same size.

19. The method of claim 12, wherein the implicit mapping is based on a control channel element (CCE) index of the first PDCCH transmission.

20. A method for wireless communications by a network entity, comprising:
transmitting, to a user equipment, an uplink grant comprising an indication of an uplink resource to transmit an acknowledgement (ACK) and one or more downlink assignment index (DAI) bits indicating a number of bits for the user equipment to use to transmit the ACK; and
receiving, from the user equipment, the ACK via the uplink resource using the number of bits,
wherein when the user equipment and the network entity are configured with a semi-static HARQ-ACK codebook size, a number of DAI bits is one and the one DAI bit is added to the uplink grant to indicate to the user equipment whether or not to transmit the ACK and the number of bits are determined according to the semi-static HARQ-ACK codebook size.

21. The method of claim 20, wherein receiving the ACK via the uplink resource comprises receiving the ACK on a physical uplink shared channel (PUSCH).

22. The method of claim 21, wherein when the number of bits is 1 or 2 the ACK punctures the PUSCH, and wherein when the number of bits is greater than 2 the ACK is rate matched around the PUSCH.

23. A user equipment comprising:
a memory; and
a processor coupled to the memory, wherein the processor is configured to:
receive downlink control information (DCI) comprising one or more resource indicator (RI) bits configured to indicate to the user equipment a subset of resources available for transmitting uplink control information (UCI) in a physical uplink control channel (PUCCH) transmission, wherein:
the DCI is received on one or more resources of a first physical downlink control channel (PDCCH) transmission, wherein the subset is one of a plurality of subsets, each of the plurality of subsets corresponding to a unique subset of PUCCH resources; and
a number of RI bits is X, wherein a total number of PUCCH resources is Y, wherein a total number of subsets of the PUCCH resources is $2^X$, wherein (Y modulo $2^X$) of the total number of subsets consist of (floor(Y/$2^X$)+1) PUCCH resources and any remaining of the total number of subsets consist of (floor(Y/$2^X$)) PUCCH resources;
determine, based on the RI bits of the DCI, the subset of resources available for transmitting UCI in the PUCCH;
identify a particular PUCCH resource within the determined subset of resources to transmit the UCI based on an implicit mapping of PDCCH resources to PUCCH resources and the one or more resources of the first PDCCH transmission; and
transmit the UCI using the particular PUCCH resource.

24. The user equipment of claim 23, wherein the processor is further configured to:
receive multiple PDCCH transmissions on multiple component carriers (CCs) or across multiple slots, wherein the UCI acknowledges the multiple PDCCH transmissions.

25. The user equipment of claim 23, wherein the processor is further configured to receive multiple PDCCH transmissions, wherein the first PDCCH transmission is a last transmission of the multiple PDCCH transmissions.

26. The user equipment of claim 23, wherein the processor is further configured to receive multiple PDCCH transmissions, wherein the first PDCCH transmission has a smallest component carrier (CC) index of the multiple PDCCH transmissions.

27. The user equipment of claim 23, wherein the processor is further configured to receive multiple PDCCH transmissions, wherein the UCI acknowledging the multiple PDCCH transmissions is sent in a same uplink (UL) slot.

28. The user equipment of claim 23, wherein at least two of the plurality of subsets have different sizes.

29. The user equipment of claim 23, wherein each of the plurality of subsets has the same size.

30. The user equipment of claim 23, wherein the implicit mapping is based on a control channel element (CCE) index of the first PDCCH transmission.

31. A user equipment comprising:
a memory; and
a processor coupled to the memory, wherein the processor is configured to:
receive, from a base station, an uplink grant comprising an indication of an uplink resource to transmit an acknowledgement (ACK) and one or more downlink assignment index (DAI) bits;
determine a number of bits to use to transmit the ACK based on the DAI bits; and
transmit, to the base station, the ACK via the uplink resource using the determined number of bits,
wherein when the user equipment and the base station are configured with a semi-static HARQ-ACK codebook size, a number of DAI bits is one and the one DAI bit is added to the uplink grant to indicate to the user equipment whether or not to transmit the ACK and the number of bits are determined according to the semi-static HARQ-ACK codebook size.

32. The user equipment of claim 31, wherein to transmit the ACK comprises to transmit the ACK on a physical uplink shared channel (PUSCH).

33. The user equipment of claim 32, wherein when the determined number of bits is 1 or 2 the ACK punctures the PUSCH, and wherein when the determined number of bits is greater than 2 the ACK is rate matched around the PUSCH.

34. A network entity comprising:
a memory; and
a processor coupled to the memory, wherein the processor is configured to:
   transmit downlink control information (DCI) comprising one or more resource indicator (RI) bits configured to indicate to a user equipment a subset of resources available for transmitting uplink control information (UCI) in a physical uplink control channel (PUCCH) transmission, wherein:
   the DCI is transmitted on one or more resources of a first physical downlink control channel (PDCCH) transmission, wherein the subset is one of a plurality of subsets, each of the plurality of subsets corresponding to a unique subset of PUCCH resources; and
   a number of RI bits is X, wherein a total number of PUCCH resources is Y, wherein a total number of subsets of the PUCCH resources is $2^X$, wherein (Y modulo $2^X$) of the total number of subsets consist of (floor(Y/$2^X$)+1) PUCCH resources and any remaining of the total number of subsets consist of (floor(Y/$2^X$)) PUCCH resources;
   determine, based on the RI bits of the DCI, the subset of resources available for transmitting UCI in the PUCCH;
   identify a particular PUCCH resource within the determined subset of resources to monitor for the UCI based on an implicit mapping of PDCCH resources to PUCCH resources and the one or more resources of the first PDCCH transmission; and
   monitor the particular PUCCH resource for the UCI.

35. The network entity of claim 34, wherein the processor is further configured to:
   transmit multiple PDCCH transmissions on multiple component carriers (CCs) or across multiple slots, wherein the UCI acknowledges the multiple PDCCH transmissions.

36. The network entity of claim 34, wherein the processor is further configured to transmit multiple PDCCH transmissions, wherein the first PDCCH transmission is a last transmission of the multiple PDCCH transmissions.

37. The network entity of claim 34, wherein the processor is further configured to transmit multiple PDCCH transmissions, wherein the first PDCCH transmission has a smallest component carrier (CC) index of the multiple PDCCH transmissions.

38. The network entity of claim 34, wherein the processor is further configured to transmit multiple PDCCH transmissions, wherein the UCI acknowledges the multiple PDCCH transmissions, and wherein the UCI is communicated in a same uplink (UL) slot.

39. The network entity of claim 34, wherein at least two of the plurality of subsets have different sizes.

40. The network entity of claim 34, wherein each of the plurality of subsets has the same size.

41. The network entity of claim 34, wherein the implicit mapping is based on a control channel element (CCE) index of the first PDCCH transmission.

42. A network entity comprising:
a memory; and
a processor coupled to the memory, wherein the processor is configured to:
   transmit, to a user equipment, an uplink grant comprising an indication of an uplink resource to transmit an acknowledgement (ACK) and one or more downlink assignment index (DAI) bits indicating a number of bits for the user equipment to use to transmit the ACK; and
   receive, from the user equipment, the ACK via the uplink resource using the number of bits,
   wherein when the user equipment and the network entity are configured with a semi-static HARQ-ACK codebook size, a number of DAI bits is one and the one DAI bit is added to the uplink grant to indicate to the user equipment whether or not to transmit the ACK and the number of bits are determined according to the semi-static HARQ-ACK codebook size.

43. The network entity of claim 42, wherein to receive the ACK via the uplink comprises to receive the ACK on a physical uplink shared channel (PUSCH).

44. The network entity of claim 43, wherein when the number of bits is 1 or 2 the ACK punctures the PUSCH, and wherein when the number of bits is greater than 2 the ACK is rate matched around the PUSCH.

* * * * *